US007000303B2

(12) United States Patent
Talwar et al.

(10) Patent No.: US 7,000,303 B2
(45) Date of Patent: Feb. 21, 2006

(54) METHOD OF REPAIRING A CRACK IN A COMPONENT UTILIZING FRICTION STIR WELDING

(75) Inventors: Rajesh Talwar, Frontenac, MO (US); Rigoberto Perez, Chesterfield, MO (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/279,950

(22) Filed: Oct. 24, 2002

(65) Prior Publication Data

US 2003/0217452 A1 Nov. 27, 2003

(51) Int. Cl.
*B23P 6/00* (2006.01)

(52) U.S. Cl. .............................. 29/402.01; 29/402.04; 29/402.07; 29/402.09; 29/402.11; 29/402.12; 29/402.14; 29/402.16; 228/112.1; 228/2.1

(58) Field of Classification Search ............ 29/402.07, 29/402.09, 402.13, 402.16, 402.01, 402.04, 29/402.06, 402.11, 402.12, 402.14; 228/112.1, 228/119, 2.1
See application file for complete search history.

(56) References Cited

U.S. PATENT DOCUMENTS

| | | | | |
|---|---|---|---|---|
| 5,460,317 A * | 10/1995 | Thomas et al. | .......... | 228/112.1 |
| 5,697,544 A | 12/1997 | Wykes | | |
| 5,813,592 A * | 9/1998 | Midling et al. | .......... | 228/112.1 |
| 5,975,406 A * | 11/1999 | Mahoney et al. | ........ | 228/112.1 |
| 6,168,067 B1 * | 1/2001 | Waldron et al. | ......... | 228/112.1 |
| 6,173,880 B1 | 1/2001 | Ding et al. | | |
| 6,213,379 B1 | 4/2001 | Takeshita et al. | | |
| 6,230,957 B1 | 5/2001 | Arbegast et al. | | |
| 6,237,835 B1 * | 5/2001 | Litwinski et al. | ........ | 228/112.1 |
| 6,422,449 B1 * | 7/2002 | Ezumi et al. | ............ | 228/114.5 |

* cited by examiner

*Primary Examiner*—David P. Bryant
*Assistant Examiner*—Jermie E. Cozart
(74) *Attorney, Agent, or Firm*—Artz & Artz, P.C.

(57) ABSTRACT

A method of repairing a crack (14) in a component (12). The method includes preparing a surrounding surface (22) of the crack (14) for repair and welding a first portion (24) of the component (12) on a first side (26) of the crack (14) to a second portion (28) of the component (12) on a second side (30) of the crack (14) to form a fused crack area (50). The method may also include applying a patch (78) over the fused crack area (50) for additional strength.

21 Claims, 3 Drawing Sheets

METHOD OF REPAIRING A CRACK IN A COMPONENT UTILIZING FRICTION STIR WELDING

RELATED APPLICATION

The present invention is related to U.S. Pat. No. 5,697,544 entitled "ADJUSTABLE PIN FOR FRICTION STIR WELDING TOOL" incorporated by reference herein.

TECHNICAL FIELD

The present invention relates generally to aeronautical vehicle systems, and more particularly, to a method of repairing a crack in an aircraft component.

BACKGROUND OF THE INVENTION

Service life of an aircraft is currently longer than in previous years and it is foreseeable and expected that service life will continue to increase in the future. The service life for many aircraft is longer and thus components of the aircraft are being utilized, in operation of the aircraft, for longer periods of time than originally intended and designed.

Due to the longer operating lives of the aircraft components, concerns have been expressed relating to fatigue life of the components. In particular, crack initiation, crack growth, and related topics have become of interest. Increased fatigue has caused an increasing number of cracks to develop and an increased amount of growth of existing cracks in aircraft components. Crack initiation and growth is also a concern due to potential inability to operate the aircraft, time and costs involved in repair of the cracks, and reoccurrence of crack growth after repair. Repair of cracks in both military and commercial aircraft is costly and generally crack repair is only a temporary solution.

Typically, crack growth is impeded or repaired using one of the following methods. Impedance of crack growth is facilitated by drilling a hole at each end of the crack, which is sometimes referred to as "stop drilling". Stop drilling is only a temporary fix, typically the cracks over time return to growing, since area surrounding the crack is fatigued and the additional holes further weaken the component.

One method of repairing a crack includes use of a composite patch, which is applied through use of a structural adhesive over and directly to the crack and adhered to and forming a bond with the component of interest. The composite patch transfers load normally experienced on portions of the component near crack ends to areas surrounding the crack. The adhesive is typically an epoxy, but may be a form of glue, paste, or adhesive tape. The composite patch is preferred when higher strength is desired for a particular structural area.

Another method of repairing a crack includes application of a metallic patch over the crack. The metallic patch is fastened to the component of interest, also forming a bond with the component, via multiple fasteners such as rivets or bolts, which is labor intensive. The metallic material is preferred when the component of interest is utilized in an application that exhibits large temperature variances. In large temperature varying applications it is also preferred that the patch be of similar or same material as that of the component such that the component and the patch have similar expansion and contraction properties. The bond between the patch and the component withstands temperature changes better when the patch and the component are of similar material.

Although, the repairing methods are more durable and hold up for a longer period of time than the stop drilling method, they too are only temporary. Thus, none of the above-described methods fully repair or eliminate cracks and eventually the cracks return to growing.

It would therefore be desirable to provide a more robust crack repair technique, which provides a more permanent solution to crack initiation and growth.

SUMMARY OF THE INVENTION

The present invention provides a method of repairing a crack in an aircraft component. The method includes preparing a surrounding surface of the crack for repair and welding a first portion of the component on a first side of the crack to a second portion of the component on a second side of the crack to form a fused crack area. The method may also include applying a patch over the fused crack area for additional strength.

The present invention has several advantages over existing crack repairing techniques. One advantage of the present invention is that it provides a welding process of repairing cracks that does not melt material of the component, thereby, providing minimal distortion, residual stress, and alteration to chemical and physical properties of the component.

Another advantage of the present invention is that it provides a method of fusing materials surrounding a crack that traditionally are known to be unweldable.

Furthermore, the present invention provides a method of repairing a crack that is more durable and longer lasting than traditional repair techniques.

The present invention itself, together with further objects and attendant advantages, will be best understood by reference to the following detailed description, taken in conjunction with the accompanying drawing.

DETAILED DESCRIPTION OF THE PREFERRED EMBODIMENT

While the present invention is described with respect to a method of repairing a crack of a component of an aircraft, the present invention may be adapted for various applications including: aeronautical vehicles, land-based vehicles, nautical vehicles, or other applications known in the art that require repair of a crack.

In the following description, various operating parameters and components are described for one constructed embodiment. These specific parameters and components are included as examples and are not meant to be limiting.

Also, in the following description the term "component" refers to any vehicle component including a panel, a stiffner, a longeron, a rib, or other vehicle component known in the art. The component may be formed of aluminum, magnesium, steel, copper, titanium, or a nickel based alloy such as inconel. The aluminum may be of various series type known in the art such as 2000, 5000, 6000, 7000, and 8000 series aluminum. The component may also be formed of some other material known in the art.

Additionally, the aircraft industry utilizes particular traditionally unweldable materials in formation of various components due to inherent advantages of their physical properties. The inherent advantages outweigh increased cost of the traditionally unweldable material over less expensive weldable materials. For example, many aircraft panels are formed of 2000 and 7000 series aluminum, over 5000 and 6000 aluminum, due to lightweight and durable properties contained therein. Since 2000 and 7000 series aluminum material has been known to be unweldable, a component formed of such material having a crack that is of a size large enough to require a repair may either be scrapped or one of the traditional previously described temporary repair methods may be attempted to extend life of the component. Replacement of scrapped aircraft components is costly and therefore undesirable. Thus, the present invention provides a method of repairing cracks within a component formed of the above previously unweldable materials.

Figure 1:
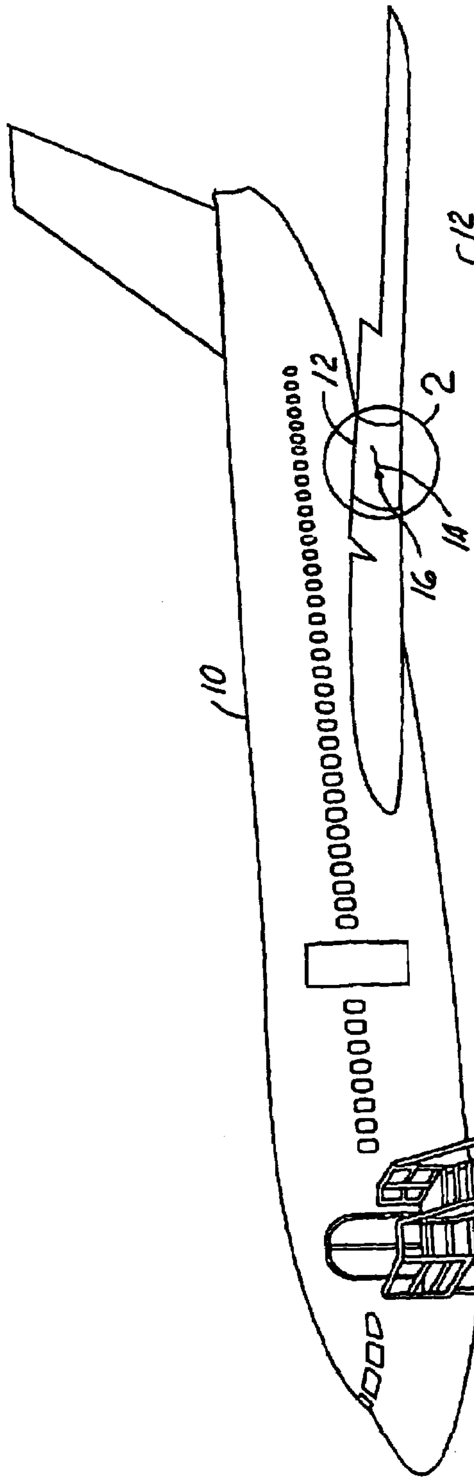
FIG. 1 perspective view of an aircraft having a component with a crack in accordance with an embodiment of the present invention.
Figure 2:
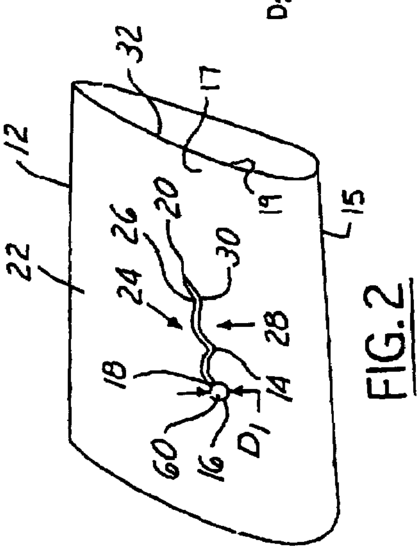
FIG. 2 is a perspective close-up view of the component in accordance with an embodiment of the present invention.

Referring now to FIGS. 1 and 2, a perspective view of an aircraft 10 having a component 12 with a crack 14 and a perspective close-up view of the component 12 in accordance with an embodiment of the present invention are shown. The crack 14 is located within an upper panel 15 having topside 17 and a backside 19. The crack 14 extends from a through hole 16 within the component 12 and has a first end 18 and a second end 20. The crack 14 has an associated surrounding surface 22. The component 12 has a first portion 24 on a first side 26 of the crack 14 and a second portion 28 on a second side 30 of the crack 14. The component 12 as stated above may be a panel, as shown, or may be some other component known in the art.

The crack 14 as shown is for example purposes only; the crack 14 may begin and end at various locations of the component 12. The crack 14 may not extend from a hole and may extend to an edge of the component, such as edge 32. The crack 14 may also have multiple branches and be of various size and shape.

Figure 3:
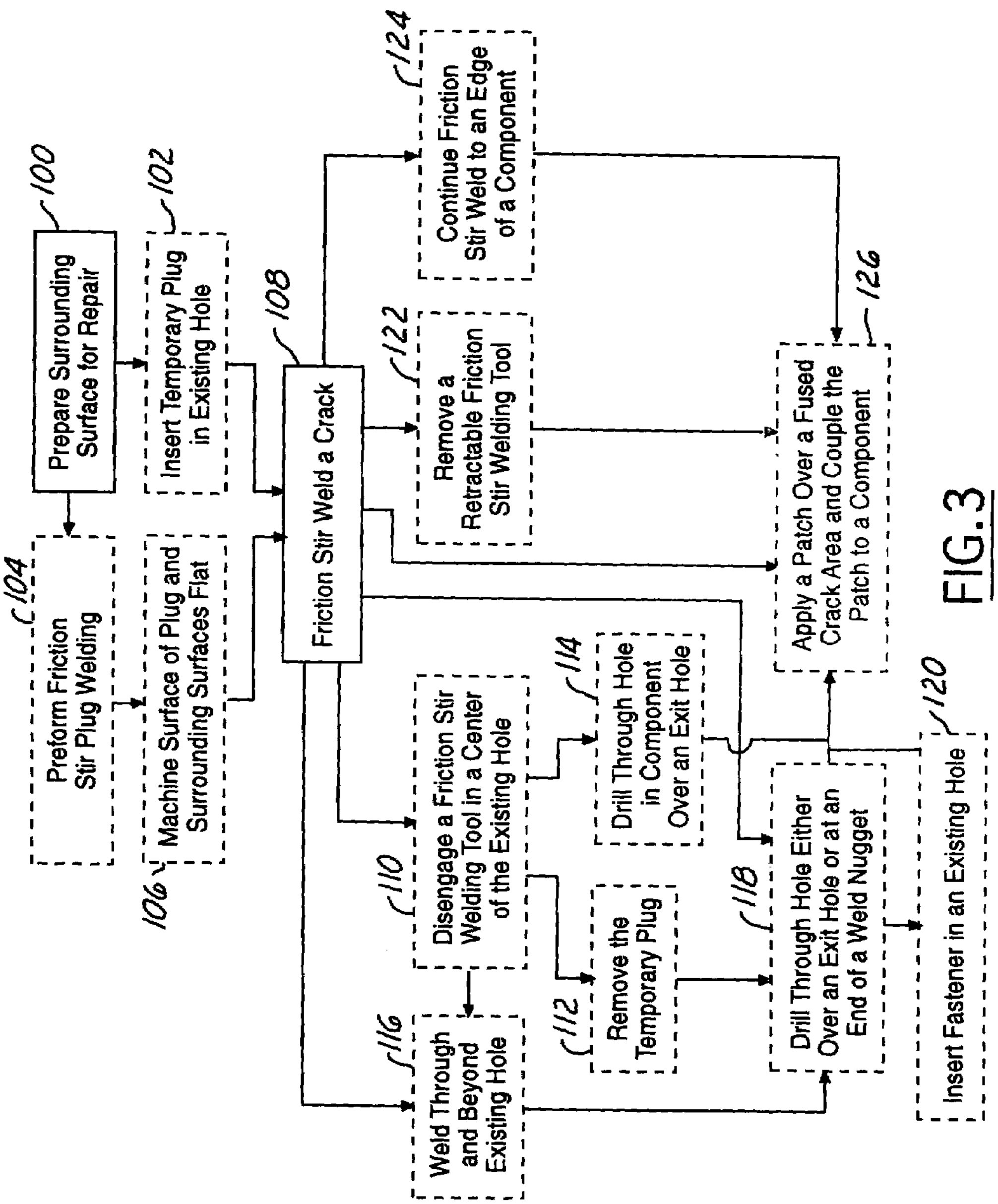
FIG. 3 is a logic flow diagram illustrating a method of repairing the crack in accordance with an embodiment of the present invention.

Referring now also to FIG. 3, a logic flow diagram illustrating a method of repairing the crack 14 in accordance with an embodiment of the present invention is shown.

In step 100, the surrounding surface 22 is prepared for repair. In preparation the surrounding surface is freed of particles such as dust, dirt, oils, or other particles that may interfere with welding of the crack 14, using methods known in the art.

Figure 4:
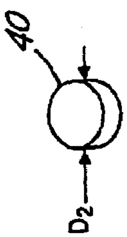
FIG. 4 is a perspective view of a sample plug used in accordance with a plug welding technique of the present invention.

In step 102, when a hole exists approximately near an end of a crack, such as the hole 16 existing near the first end 18, a temporary plug 40 is inserted into the hole 16. The example of FIG. 3 is shown since cracks tend to grow and commonly extend from existing holes in a component, due to a component structure in general being weaker near a hole edge. Of course, a crack may not initiate from a hole. The temporary plug 40 is best seen in FIG. 4. The temporary plug 40 is used to prevent material of the component from being turned into and pushed out or through the hole 16. The temporary plug 40 may be formed of similar material to that of the component 12 and may be of various size and shape. In a preferred embodiment of the present invention the plug 40 is of a material having a higher melting point such that the plug 40 is not fused to the component during friction stir welding of the component 12. Also, in the preferred embodiment of the present invention, the plug 40 is shaped similar to shape of the hole 16 and is slightly larger to fit tightly in the hole 16. For example, the hole 16 is circular in shape having a diameter $D_1$ and the plug 40 is cylindrical having a diameter $D_2$, which is slightly larger than $D_1$. As an alternative to step 102 steps 104–106 may be performed.

In step 104, the existing hole 16 may be friction stir plug welded.

In step 106, upon completion of friction stir plug welding the hole 16, outer surface of the plug and surrounding surfaces are machined flat using methods known in the art, as to smooth surface 22 near where hole 16 existed.

Figure 5:
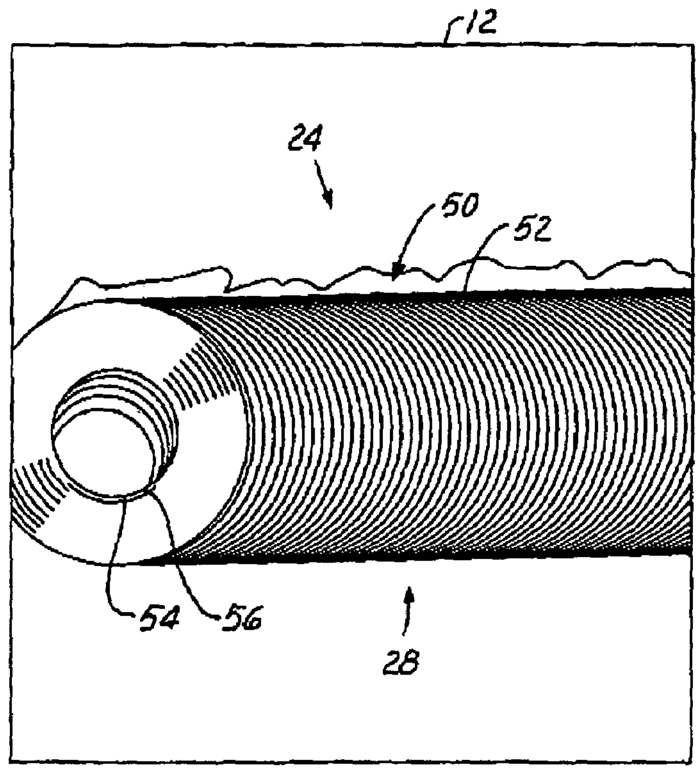
FIG. 5 is a top perspective close-up view of a partial exit hole from friction stir welding the crack in accordance with an embodiment of the present invention.

In step 108, a friction stir welding tool, not shown, is utilized to friction stir-weld the first portion 24 to the second portion 28 to form a fused crack area 50. The fused crack area 50 has a weld nugget 52, located in approximately the same location as crack 14, as best seen in FIG. 5. In following FIGS. 6, 7, and 8 weld nugget 52 is represented as a curved line for simplicity. During friction stir welding of the component 12, the welding tool is moved along the crack 14, to join the first portion 24 to the second portion 28 while rotating at a high speed, which is performed whether the crack 14 initiated from a hole or not. Action between the friction stir welding tool and material of the component 12 creates frictional heat, which softens but does not melt the material. The heated material or plasticized material is then consolidated to create one piece where there were originally two, as known in the art. Upon completion of friction stir welding the crack 14, an exit hole 56 may exist within the component 12, depending upon whether the friction stir welding tool continues welding to an edge of the component 12, as described in step 124.

There are several advantages to friction stir welding the crack 14 over traditional repair techniques. In friction stir welding there is no melting of the material, thus minimizing distortion, residual stress, and alteration of mechanical properties of the component 12. The fused crack area 50 has mechanical properties close to that of the original component 12 before the crack 14 occurred. Friction stir welding only requires a single welding pass over the crack 14 as compared to traditional welding techniques that require multiple passes, thereby minimizing time and costs involved in repairing the crack 14. Multiple other advantages are also associated with friction stir welding including no requirement for filler material, reduced weight of a welded component, increased repeatability, and various other advantages known in the art.

In friction stir welding forging load is applied during welding, which is reacted by a backup bar (not shown). In situations when either a backup bar cannot be used or when a backup bar is infeasible to use due to fabrication costs, friction stir welding can be accomplished through use of a double shoulder tool or bobbin tool. The use of a bobbin tool eliminates the need for a backup bar. A backup bar may be used when the component 12 is removed and repaired external to the aircraft 10. To allow for in-situ repair, of the component 12, the bobbin tool (also not shown) may be used. The Bobbin tool has dual shoulders, one for applying load on the topside 17 and another for applying load on the backside 19 of the component 12. Equal and opposite load is applied by the topside shoulder being pressed in a downward direction and by the backside shoulder being pulled in an upward direction, as known in the art.

Upon completion of step 108, the hole 16 no longer exists but rather a depression or a partial exit hole 56 exists, which may or may not have similar dimension to that of the originally existing hole 16. Exit hole 56 may also have a jagged edge 54, which has relatively large stress intensification. Exit hole 56 and jagged edge 54 are best seen in FIG. 5. Higher the stress intensification the more likely that crack initiation or growth is to occur.

To fuse and prevent the occurrence of an exit hole 56 upon finishing friction stir welding of the crack 14 a retractable friction stir welding tool may be utilized. The retractable friction stir welding tool may be used whether or not the crack 14 initiated from a hole. Friction stir welding begins at either end 18 or 20 and welding is extended beyond which ever end 18 or 20 where welding was not initiated. The retractable friction stir welding tool may also begin welding in at an existing hole such as hole 16 or may begin welding at an end, such as end 20 where a hole does not exist.

In step 110, when the temporary plug 40 is used the friction stir welding tool is disengaged in a center 60 of the exit hole 56.

In step 112, the temporary plug 40 is then removed from the component 12 when the existing hole 16 is larger in diameter than diameter of a friction stir welding tool pin. The plug 40 is removed by drilling out the plug 40 from the component 12.

As known in friction stir welding, the exit hole 56 remains, where the friction stir welding tool is pulled from the component 12. The exit hole 56 may be in the same location as the existing hole 16. The friction stir welding tool may be pulled out of the existing hole 16 or may be pulled out elsewhere when the hole 16 did not originally exist, in other words when the crack 14 did not initiate from a hole. The remaining exit hole 56 may or may not cause concern depending upon the application. The present invention provides versatility in that the exit hole 56 may be left in the component 12, fused closed, drilled larger, or may not be formed, as further described below.

Figure 6:
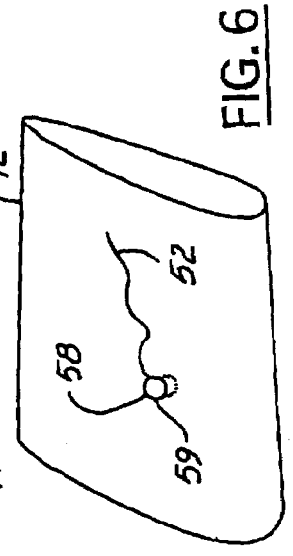
FIG. 6 is a perspective close-up view of the component illustrating friction stir welding beyond an existing through hole in accordance with an embodiment of the present invention.

In step 114, the exit hole 56 may be enlarged and extended through component 12 so as to create a finished hole 58 by drilling through component 12 over exit hole 56. Finished hole 58 is best seen in FIG. 6, having a smooth circular edge 59 unlike the jagged edge 54, thus reducing stress intensification of the exit hole 56.

Figure 7:
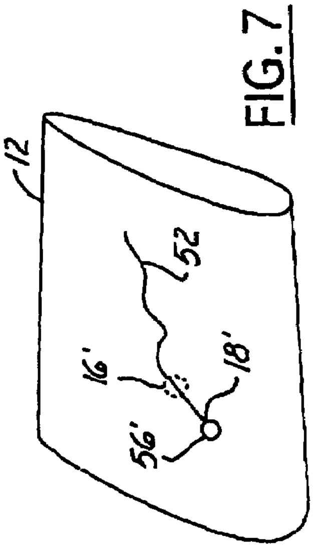
FIG. 7 is a perspective close-up view of the component illustrating a finished through hole drilled at an end of the crack in accordance with an embodiment of the present invention.

In step 116, when diameter of the friction stir welding pin is larger in diameter than the existing hole 16 then friction stir welding may be continued through and beyond the existing hole 16, represented by dashed circle 16' in FIG. 7 since after friction stir welding the existing hole 16 no longer exists, to a partial exit hole 56'.

In step 118, upon completion of steps 108, 112, 114, or 116 the existing hole 16 and the exit holes 56 and 56' may be drilled larger, to reduce stress intensification, similar to step 114. Upon completion of step 118, step 120 or step 124 may be performed.

Figure 8:
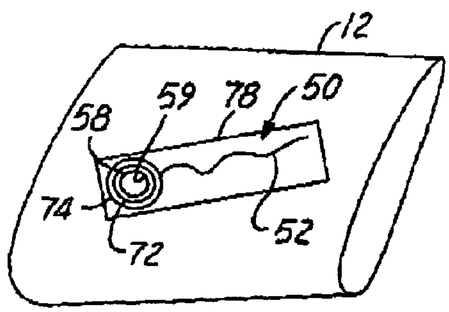
FIG. 8 is a perspective close-up view of the component illustrating use of a fastener in accordance with an embodiment of the present invention.

In step 120, instead of just allowing the finished hole 58 to remain, a fastener 72 having a washer 74 may be extended through the finished hole 58 and fastened to the component 12, as best seen in FIG. 8. The combination of the fastener 72 and the washer 74 reduce stresses on edge 59 of the finish hole 58 and aid in preventing the original crack 14 from regrowing and the occurrence of an additional crack from growing from the finished hole 58. Of course, the fastener may be of various type and style known in the art.

In step 122, as the retractable friction stir welding tool welds beyond end 18 or 20 it is slowly removed from the component 12, as pressure is left on the component 12 and the exit hole 56 is fused closed. For further explanation of the retractable friction stir welding tool see U.S. Pat. No. 5,697,544.

Figure 9:
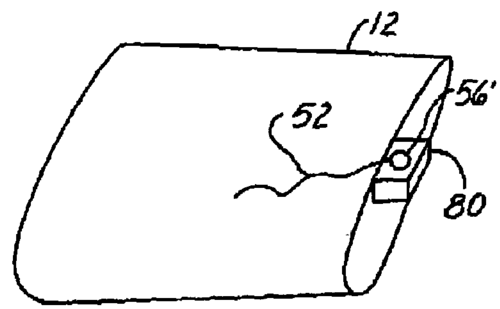
FIG. 9 is a perspective close-up view of the component illustrating use of tab material when friction stir welding to an edge of the component in accordance with an embodiment of the present invention.

In step 124, when welding a crack in a direction that is towards an edge of the component the friction stir welding tool, for example, may continue to weld the first portion 24 to the second portion 28 up through the edge 32 to prevent existence of a hole where the friction stir welding tool disengaged from the component 12. A tab 80 formed of a similar material as that of the component 12 is butted up against the edge 32 and friction stir welding is extended into the tab, such that a partial exit hole is formed in the tab 80 rather than in the component 12, as best seen in FIG. 9. The tab is than removed from the component 12 using methods known in the art. The tab may be of various size, shape, and be formed of various materials known in the art.

Although, mechanical properties of the fused crack area 50 are close to that of the original component 12 without the crack 12, step 126 may be performed to increase strength of the fused crack area 50.

In step 126, to further reinforce the fused crack area 50 a patch 78 may be applied over the fused crack area 50 containing approximately where the crack 14 existed. The patch 78 may be of a composite material, a metallic material, or other material known in the art. When a composite material is used the patch 78 may be adhered to the component 12 using a structural bonding material known in the art. When a metallic material is used, the patch 78 may be riveted, welded, or coupled to the component 12 using some other fastening or bonding technique known in the art. The composite material may be used when higher strength is desired for a given structural area. The metallic material is preferred when the component of interest is utilized in an application that exhibits large temperature variances.

The above-described steps, are meant to be an illustrative example, the steps may be performed sequentially, synchronously, or in a different order depending upon the application.

Figure 10:
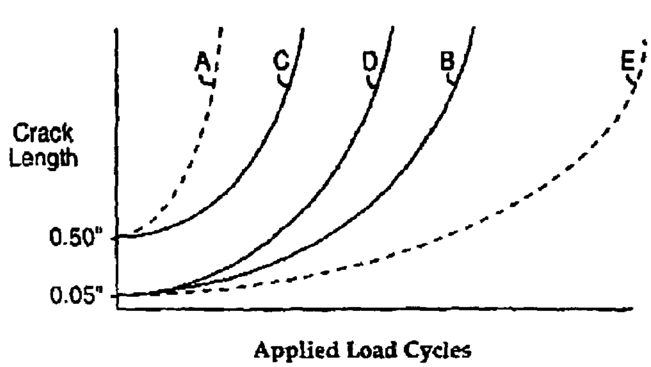
FIG. 10 is a plot illustrating multiple crack repair techniques in accordance with multiple embodiments of the present invention.

Referring now to FIG. 10, a plot illustrating multiple crack repair techniques in accordance with multiple embodiments of the present invention is shown. The plot is of crack length versus applied load cycles for multiple coupons or metallic testing strips, not shown, each having a similar crack and repaired using methods of the present invention.

Two initial approximate crack lengths are illustrated, 0.5" and 0.05". Curves having an initial 0.05" crack length correspond to coupons that may have no cracks or crack lengths up to 0.05" in length, which is the smallest crack length that is able to be detected. A first reference base curve A and a second reference base curve B are shown for both initial crack lengths of a first coupon having the 0.5" initial crack length and a second coupon having the initial 0.05" crack length, respectively. When a patch is applied to the first coupon the coupon is able to withstand an increased amount of load cycles than without the patch, as shown by curve C relative to curve A. When friction stir welding is used on the first coupon, the 0.5" crack is reduced to a crack equal to or smaller than 0.05" in length, and the coupon is able to withstand a greater number of load cycles, as shown by curve D relative to curve A. However, the number of cycles that a friction stir welded part can sustain, represented by curve D, is less than the number of cycles for the second coupon, with an initial 0.05" crack length and is not friction stir welded. Additionally, when both friction stir welding is used to minimize or eliminate a crack and a patch is applied to the coupon, as shown by curve E with the first coupon, the coupon is able to withstand an increased number of load cycles over either applying a patch or by friction stir welding the crack.

Thus, the combination of the friction stir welding and the application of the patch increases service life of the component over that of even the base material. Using both friction stir welding and application of the patch allows service life of a component to potentially be more than doubled, depending upon the component and the application.

The present invention therefore provides a method of repairing a crack of a component with increased durability than previous repair techniques. A friction stir welded component of the present invention in addition with the applied patch is able to withstand increased flight cycles, thus increasing productive life of the component.

The above-described apparatus and method, to one skilled in the art, is capable of being adapted for various applications including: aeronautical applications, land-based vehicle applications, or other applications known in the art that require repair of a crack. The above-described invention can also be varied without deviating from the true scope of the invention.

What is claimed is:

1. A method of repairing a crack in a component comprising:
- preparing a surrounding surface of the crack for repair;
- friction stir welding a first portion of the component on a first side of the crack to a second portion of the component on a second side of the crack to form a fused crack area;
- inserting a temporary plug into an existing hole of the component;
- friction stir welding said crack
- disengaging a friction stir welding tool in a center of a partial exit hole; and
- removing said temporary plug from the component.

2. A method as in claim 1 further comprising
- inserting a non-consumable fastener in at least one exit hole in the component.

3. A method as in claim 1 comprising:
- initiating friction stir welding at a first end of the crack;
- friction stir welding to at least a second end of the crack;
- drilling a through hole in the component to provide a finished hole; and
- inserting a non-consumable fastener in said finished hole.

4. A method as in claim 1 further comprising
- drilling a through hole in the component to provide an enlarged or extended finished hole.

5. A method as in claim 1 further comprising:
- applying a patch over said fused crack area; and
- coupling said patch to the component.

6. A method as in claim 1 wherein applying a patch comprises applying a composite patch.

7. A method as in claim 1 wherein applying a patch comprises applying a metallic patch.

8. A method as in claim 1 wherein coupling said patch comprises bonding said patch to said component via an adhesive material.

9. A method as in claim 1 wherein coupling said patch comprises fastening said patch to said component via a plurality of fasteners.

10. A method as in claim 1 further comprising continuing friction stir welding of the component to an edge of the component using additional tab material.

11. A method as in claim 1 further comprising fusing at least one hole in the component via a retractable pin tool.

12. A method as in claim 1 further comprising friction stir plug welding at least one hole in the component.

13. A method of repairing a crack in a component of an aircraft comprising:
- preparing a surrounding surface of the crack for repair;
- friction stir welding a first portion of the component on a first side of the crack to a second portion of the component on a second side of the crack to form a fused crack area;
- applying a patch over said fused crack area;
- coupling said patch to the component;
- plug welding at least one hole in the component;
- inserting a temporary plug into an existing hole of said at least one hole;
- friction stir welding said crack;
- disengaging a friction stir welding tool in a center of a partial exit hole; and
- removing said temporary plug from the component.

14. A method as in claim 13 wherein applying a patch comprises applying a patch formed of a material selected from at least one of a composite material and a metallic material.

15. A method as in claim 13 wherein friction stir welding comprises utilizing a double-sided tool to apply equal and opposite load on sides of the component.

16. A method of repairing a crack in a component of an aircraft comprising:
- preparing a surrounding surface of the crack for repair;
- friction stir welding a first portion of the component on a first side of the crack to a second portion of the component on a second side of the crack to form a fused crack area;
- applying a patch over said fused crack area;
- coupling said patch to the component; and
- inserting a fastener in at least one exit hole in the component.

17. A method as in claim 16 wherein applying a patch comprises applying a patch formed of a material selected from at least one of a composite material and a metallic material.

18. A method as in claim 16 wherein friction stir welding comprises utilizing a double-sided tool to apply equal and opposite load on sides of the component.

19. A method as in claim 16 further comprising plug welding at least one hole in the component.

20. A method of repairing a crack in a component of an aircraft comprising:
- preparing a surrounding surface of the crack for repair;
- inserting a temporary plug into an existing hole;

friction stir welding a first portion of the component on a first side of the crack to a second portion of the component on a second side of the crack to form a fused crack area;

disengaging a friction stir welding tool in a center of a partial exit hole;

removing said temporary plug from the component;

applying a patch over said fused crack area; and coupling said patch to the component.

21. A method as in claim 20 further comprising drilling a through hole at an end of said fused crack area to provide a non-plugged finished through hole.

* * * * *